United States Patent
Toya et al.

(10) Patent No.: US 10,014,696 B2
(45) Date of Patent: Jul. 3, 2018

(54) STORAGE SYSTEM AND STORAGE METHOD

(71) Applicant: Panasonic Intellectual Property Management Co., Ltd., Osaka (JP)

(72) Inventors: Shoichi Toya, Hyogo (JP); Yutaka Iwahori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 8 days.

(21) Appl. No.: 15/272,346

(22) Filed: Sep. 21, 2016

(65) Prior Publication Data

US 2017/0104349 A1 Apr. 13, 2017

(30) Foreign Application Priority Data

Oct. 8, 2015 (JP) ................................ 2015-200615

(51) Int. Cl.
*H02J 7/00* (2006.01)

(52) U.S. Cl.
CPC .......... *H02J 7/0013* (2013.01); *H02J 7/0004* (2013.01); *H02J 7/0042* (2013.01); *H02J 7/0045* (2013.01); *H02J 7/0068* (2013.01); *H02J 2007/0001* (2013.01)

(58) Field of Classification Search
CPC .................................................. H02J 7/0013
USPC ........................................................ 320/134
See application file for complete search history.

(56) References Cited

U.S. PATENT DOCUMENTS

| 2010/0073003 | A1  | 3/2010  | Sakurai et al. |
| 2016/0028263 | A1* | 1/2016  | Yau ...................... H02J 7/0021 320/107 |
| 2016/0294200 | A1* | 10/2016 | Toya ..................... H02J 7/0029 |

FOREIGN PATENT DOCUMENTS

JP 2010-081716 4/2010

* cited by examiner

*Primary Examiner* — Suchin Parihar
(74) *Attorney, Agent, or Firm* — Greenblum & Bernstein, P.L.C.

(57) ABSTRACT

A system includes: connectors electrically connected to storage battery packs respectively; at least one of a discharger that discharges electric power of the storage battery packs through the connectors and a charger that charges the storage battery packs through the connectors; an information holder that holds identification information of the connectors; a receiver that receives information of the storage battery packs and the identification information of the connectors connected to the storage battery packs, which the storage battery packs receive from the information holder, respectively from the storage battery packs through wireless communication; and a storage that stores the received information of the storage battery packs and the received identification information of the connectors connected to the storage battery packs.

18 Claims, 6 Drawing Sheets

STORAGE SYSTEM AND STORAGE METHOD

BACKGROUND

1. Technical Field

The present disclosure relates to a storage system and a storage method.

2. Description of the Related Art

As a conventional technique, a battery information acquisition device that transmits battery information acquired from a storage battery through wireless communication to a management unit that manages the state of a battery assembly connected to a plurality of storage batteries is disclosed (see Japanese Unexamined Patent Application Publication No. 2010-81716).

SUMMARY

The patent document described above, however, needs further improvement.

In one general aspect, the techniques disclosed here feature a system including: connectors electrically connected to storage battery packs respectively; at least one of a discharger that discharges electric power of the storage battery packs through the connectors and a charger that charges the storage battery packs through the connectors; an information holder that holds identification information of the connectors; a receiver that receives information of the storage battery packs and the identification information of the connectors connected to the storage battery packs, which the storage battery packs receive from the information holder, respectively from the storage battery packs through wireless communication; and a storage that stores the received information of the storage battery packs and the received identification information of the connectors connected to the storage battery packs received by the receiver.

It should be noted that general or specific embodiments may be implemented as a system, a method, an integrated circuit, a computer program, or a recording medium such as a computer-readable CD-ROM, or any selective combination thereof.

According to the aspect described above, further improvement can be achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
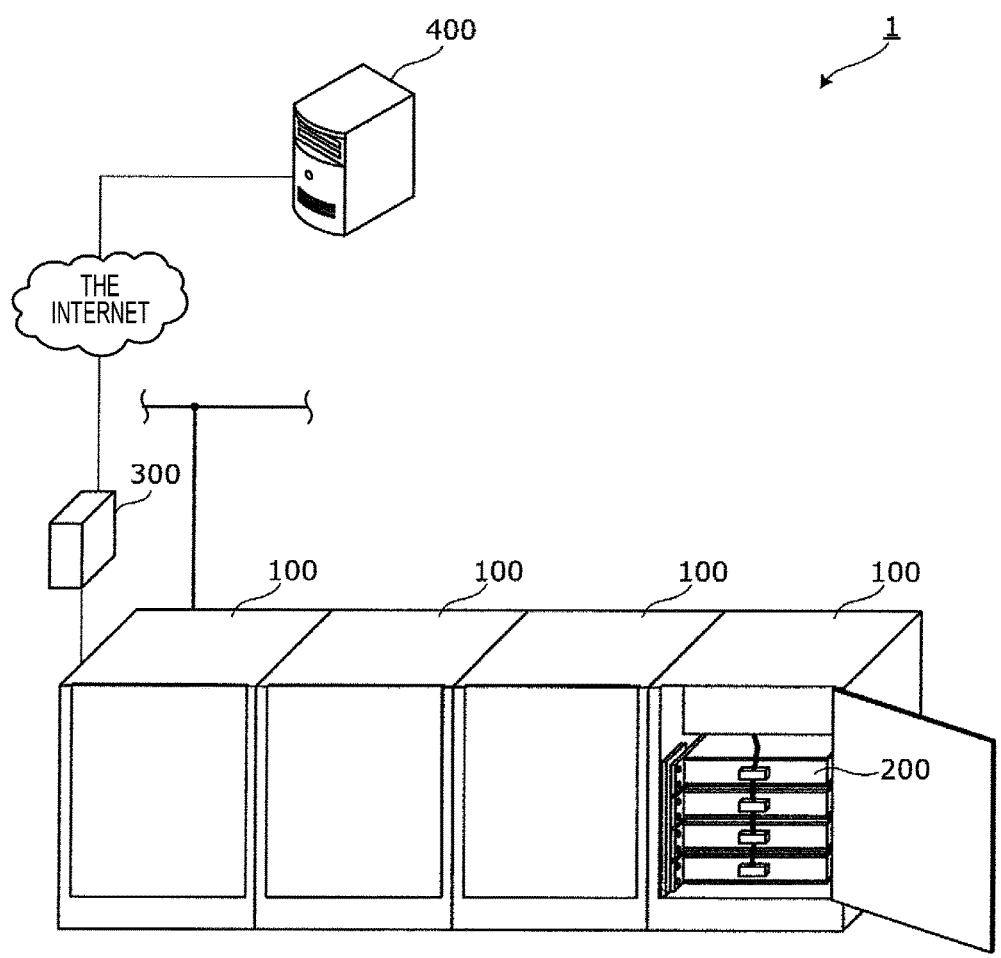
FIG. 1 schematically illustrates a configuration of a management system including a storage system according to an embodiment.

DETAILED DESCRIPTION (Underlying Knowledge Forming Basis of the Present Disclosure)

Regarding the battery information acquisition device described in "BACKGROUND," the inventor of the present disclosure found the following problems.

In Japanese Unexamined Patent Application Publication No. 2010-81716, battery information acquired from a storage battery is transmitted to the management unit through wireless communication.

Thus, in a case where a plurality of storage batteries are connected to the battery information acquisition device, it is impossible to specify a connection terminal of the device that is connected to the storage battery from which the battery information has been acquired. For this reason, even if a malfunction of a storage battery is detected based on the battery information of the storage batteries, a connection terminal to which the malfunctioning storage battery is connected cannot be specified. That is, appropriate measures based on the battery information of storage batteries cannot be taken on the storage batteries connected to the battery information acquisition device.

In view of the foregoing, to solve the problems described above, the inventor of the present disclosure examined measures as follows.

A system according to an aspect of the present disclosure includes: connectors electrically connected to storage battery packs respectively; at least one of a discharger that discharges electric power of the storage battery packs through the connectors and a charger that charges the storage battery packs through the connectors; an information holder that holds identification information of the connectors; a receiver that receives information of the storage battery packs and the identification information of the connectors connected to the storage battery packs, which the storage battery packs receive from the information holder, respectively from the storage battery packs through wireless communication; and a storage that stores the received information of the storage battery packs and the received identification information of the connectors connected to the storage battery packs.

This configuration can be used for specifying a connector to which a storage battery pack is connected among the plurality of connectors. Thus, in a case where the system has acquired state information concerning the state of storage batteries of a storage battery pack from the storage battery pack, the system can specify a connector connected to the storage battery pack from which the state information has been acquired. In this manner, appropriate measures can be taken for the storage battery pack connected to the system based on the state information. The appropriate measures herein are, for example, control of at least one of charging or discharging of the storage battery pack, malfunction detection of the storage battery pack, and collection of a malfunctioning storage battery and exchange to a storage battery that does not malfunction.

In a system according to a second aspect of the present disclosure based on the system according to the first aspect, each of the connectors and a corresponding one of the information holders may be integrated as a connector of a corresponding one of the storage battery packs.

With this configuration, the connector and the information holder can be previously associated with each other. Thus, when the system is assembled, erroneous wiring between the connector and the information holder can be suppressed. Consequently, acquisition of wrong identification information by the storage battery pack can be reduced.

A system according to a third aspect of the present disclosure is based on the system according to the first aspect and may further include first transmitters that each transmit the identification information of a corresponding one of the connectors to a corresponding one of the storage battery packs.

With this configuration, the identification information of the connectors can be transmitted to the storage battery packs.

In a system according to a fourth aspect based on the system according to the third aspect, each of the connectors, a corresponding one of the information holders, and a corresponding one of the first transmitters may be integrated as a connector of a corresponding one of the storage battery packs.

With this configuration, the connector and the information holder can be previously associated with each other so that identification information held in the information holder can be transmitted to the storage battery pack connected to the connector. In this manner, since the connector and the information holder are previously associated with each other, when the system is assembled, erroneous wiring between the connector and the information holder can be suppressed. Consequently, transmission of wrong identification information to the storage battery pack can be reduced.

In a system according to a fifth aspect based on the system according to one of the first through fourth aspects, the information holder may also hold identification information of the system, the receiver may receive identification information of the storage battery packs, identification information of the system, and the identification information of the connectors connected to the storage battery packs from the storage battery packs through wireless communication, and the system may further include a controller, and if the identification information of the system received by the receiver coincides with identification information of the system itself, the controller causes the storage to store the identification information of the storage battery packs and the identification information of the connectors connected to the storage battery packs.

In this configuration, the controller determines whether the storage battery pack that has transmitted the identification information of the storage battery pack and the identification information of the connector is a storage battery pack connected to the system itself or not, using the received identification information of the storage battery pack and the received identification information of the connector connected to the storage battery pack. If the identification information of the system received by the receiver coincides with identification information of the system itself, the controller causes the storage to store the identification information of the storage battery pack and the identification information of the connector connected to the storage battery pack. In this manner, storage of information from the storage battery packs not connected to the system itself can be reduced.

A system according to a sixth aspect is based on the system according to the fifth aspect and may further include a second transmitter that transmits the identification information of the storage battery packs, the identification information of the system, and the identification information of the connectors connected to the storage battery packs stored in the storage to a server device.

With this configuration, the server device can manage information acquired from the storage battery pack connected to the connector.

A method includes: receiving identification information of storage battery packs and identification information of connectors connected to the storage battery packs from the storage battery packs through wireless communication; and storing the received identification information of the storage battery packs and the received identification information of the connectors connected to the storage battery packs.

This configuration can be used for specifying a connector to which a storage battery pack is connected among a plurality of connectors. Thus, in a case where the system has acquired state information concerning the state of storage batteries of the storage battery pack from the storage battery pack, the system can specify a connector connected to the storage battery pack from which the state information has been acquired. In this manner, appropriate measures can be taken for the storage battery pack connected to the system based on the state information.

General or specific aspects of the above-described configurations may be implemented as a system, a method, an integrated circuit, a computer program, or a recording medium such as a computer-readable CD-ROM, or any selective combination thereof.

A system according to an aspect of the present disclosure will be specifically described with reference to the drawings.

An embodiment described below is a specific example of the present disclosure. Values, shapes, materials, components, locations and connection states of the components, steps, the order of states, etc. described in the following embodiment are examples, and are not intended to limit the scope of the disclosure. Among the components in the following description, components not recited in an independent claim representing the broadest concept will be described as optional components.

(Embodiment)

An embodiment will be described with reference to FIGS. 1 through 7.

[1. Configuration]

First, with reference to FIG. 1, an outline of a configuration of a management system including a storage system according to an embodiment of the present disclosure will be described. FIG. 1 schematically illustrates a configuration of a management system including a storage system according to an embodiment.

As illustrated in FIG. 1, a management system 1 according to an embodiment includes a plurality of storage systems 100 each including a plurality of storage battery packs 200, a communication device 300, and a server device 400.

The storage systems 100 are connected to each other, and supply electric power to an unillustrated load. The storage systems 100 may be connected in series or in parallel. Each of the storage systems 100 transmits information acquired from the storage battery packs 200 of this storage system 100 to the communication device 300.

The communication device 300 is connected to the server device 400 through the Internet. Specifically, the communication device 300 is connected to the Internet through wired communication to communicate with the server device 400. The communication device 300 may be connected to the Internet through wireless communication to communicate with the server device 400. The communication device 300 is a gateway for communication with the server device 400 through the Internet.

The server device 400 receives information from the storage systems 100 and manages the received information. Specifically, for each of the storage systems 100, the server device 400 stores the information in such a manner that identification information for identifying the storage system 100 is associated with the information acquired from the storage system 100. The server device 400 is implemented by, for example, a processor, a memory storing a program, and a memory device such as a hard disk drive for storing data.

The server device 400 is not necessarily constituted by one device and may be constituted by a plurality of devices. The server device 400 may be at least a part of a device implementing cloud computing for providing, for example, software and data through a network such as the Internet.

[1-1. Storage System and Storage Battery Pack]

A configuration of appearance of the storage system 100 will be described with reference to FIGS. 2 through 4.

Figure 2:
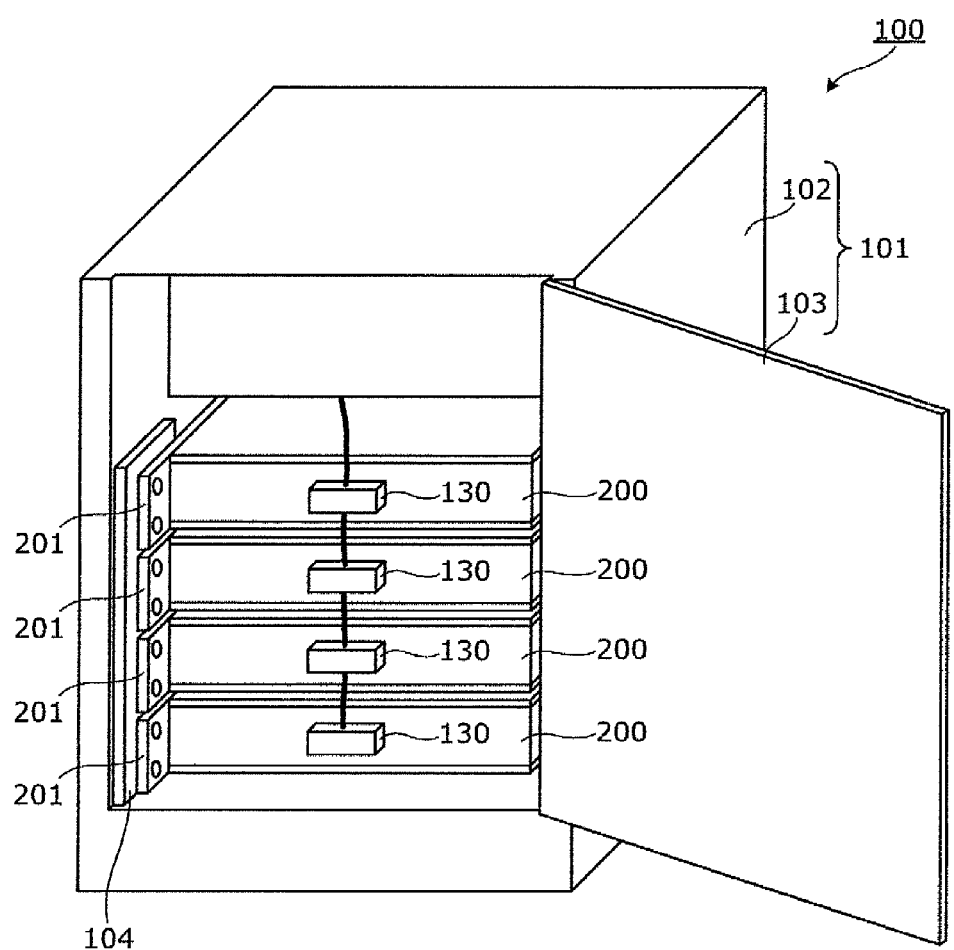
FIG. 2 is a perspective view illustrating an appearance of the storage system in a state in which storage battery packs according to the embodiment are connected to the storage system.

FIG. 2 is a perspective view illustrating an appearance of the storage system according to the embodiment in a state in which a storage battery pack is connected to the storage system. FIG. 3 is a perspective view illustrating an appearance of the storage system in a state in which the storage battery pack according to the embodiment is removed from the storage system. FIG. 4 is a perspective view illustrating an appearance of the battery pack according to the embodiment.

Figure 3:
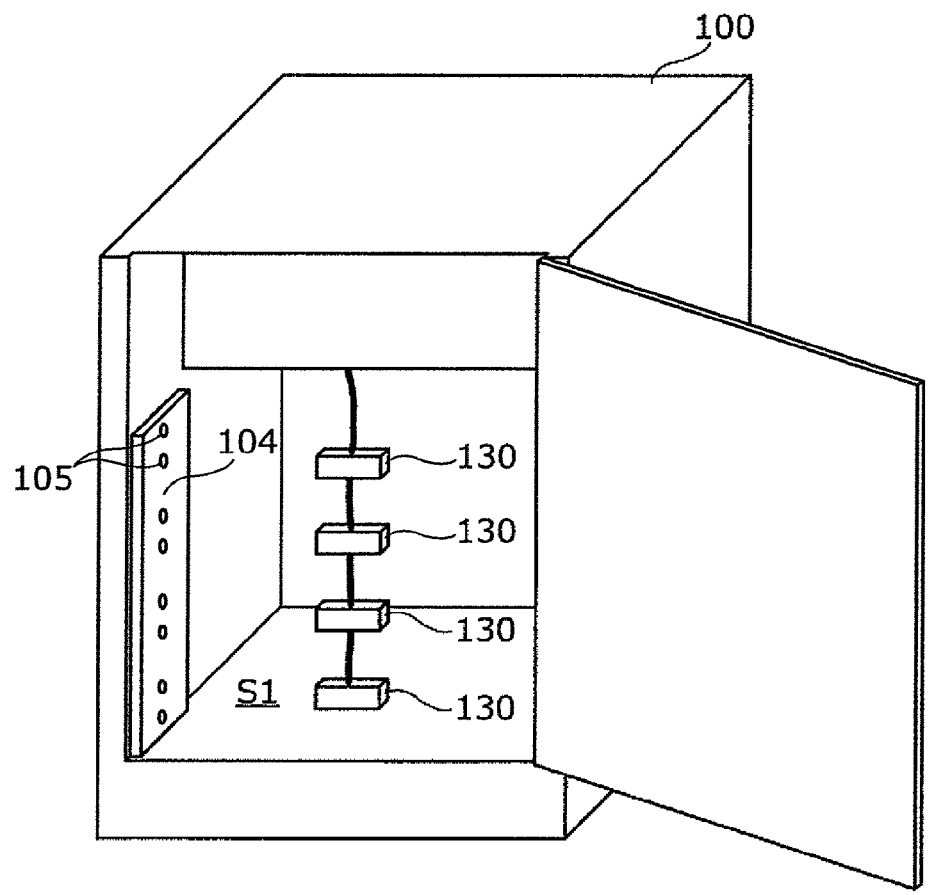
FIG. 3 is a perspective view illustrating an appearance of the storage system in a state in which the storage battery packs according to the embodiment are removed from the storage system.

As illustrated in FIGS. 2 and 3, the storage system 100 includes a package 101 including a package body 102 and a door 103, and space S1 in the package 101 accommodates a plurality of storage battery packs 200. The storage system 100 includes a plurality of connection units 120 respectively connected to connectors 250 of the storage battery packs 200. The storage system 100 includes a fixing part 104 for fixing the storage battery packs 200 to predetermined locations in the internal space S1.

Figure 4:
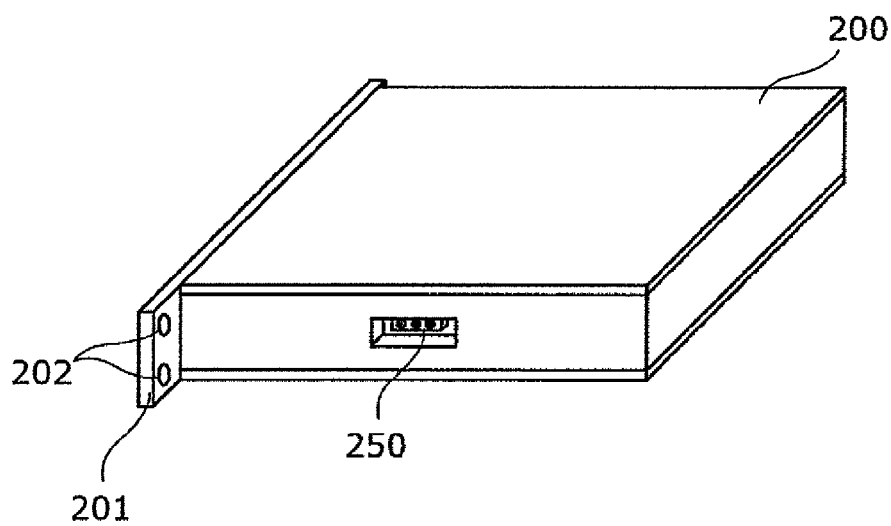
FIG. 4 is a perspective view illustrating an appearance of the battery pack according to the embodiment.

As illustrated in FIG. 4, each of the storage battery packs 200 includes a fixed part 201 to be fixed to screw holes 105 of the fixing part 104. Each of the storage battery packs 200 is fastened to a corresponding one of the screw holes 105 of the fixing part 104 with screws penetrating through holes 202 in the fixed part 201 so that the storage battery pack 200 is fixed to the fixing part 104.

The storage battery packs 200 may not be fixed to the fixing part 104 of the package 101 as long as the storage battery packs 200 are disposed at the predetermined locations in the space S1 of the package 101. The storage battery packs 200 may not be fixed with screws, and may be fixed with other fastening units.

A functional configuration of the storage system 100 and the storage battery packs 200 will be described with reference to FIG. 5.

Figure 5:
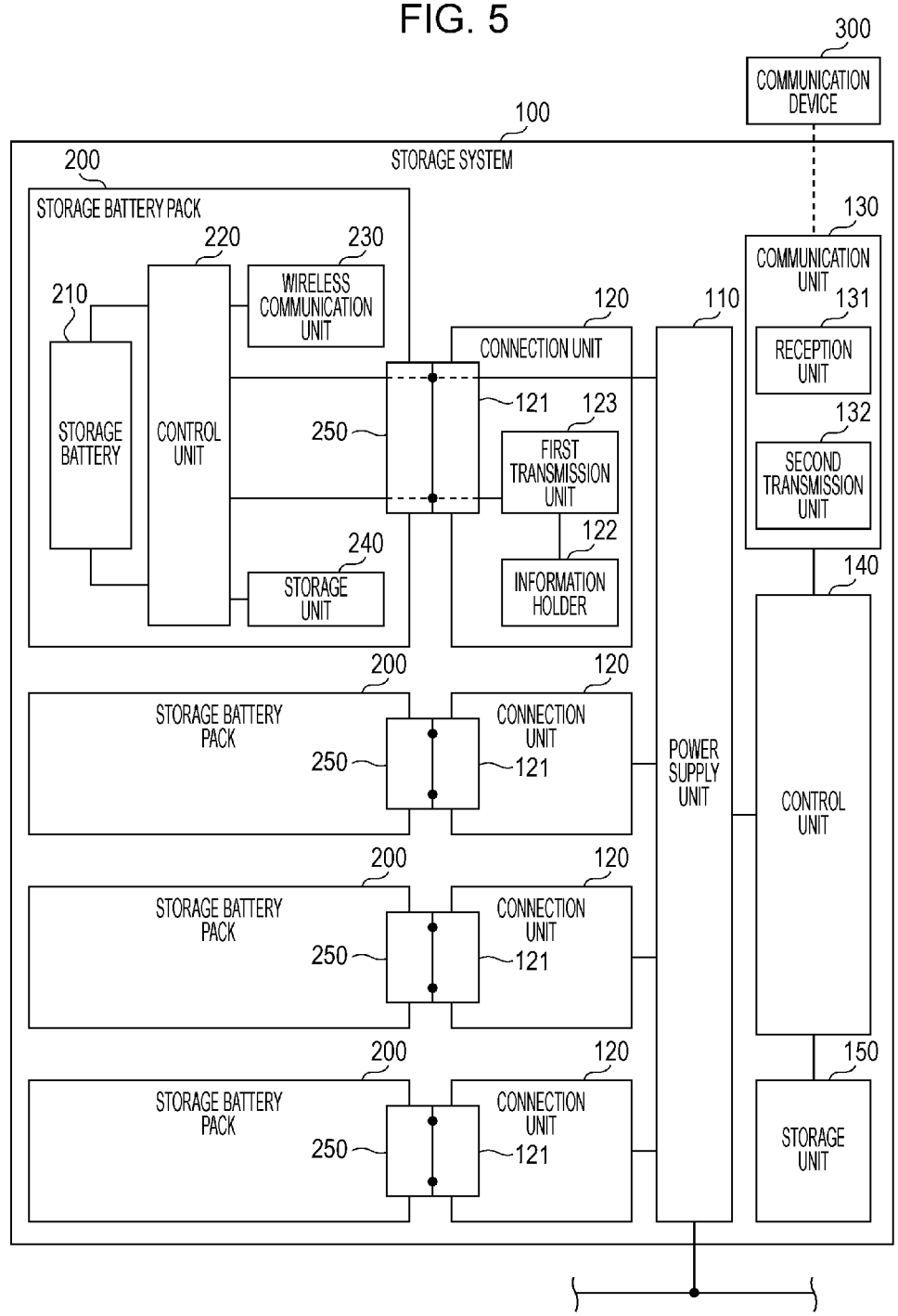
FIG. 5 is a block diagram illustrating functional configurations of the storage system and the storage battery pack according to the embodiment.

FIG. 5 is a block diagram illustrating a functional configuration of the storage system and the storage battery pack according to the embodiment.

[1-1-1. Storage System]

First, a functional configuration of the storage system 100 will be described.

As illustrated in FIG. 5, the storage system 100 functionally includes a power supply unit 110, the connection units 120, a communication unit 130, a control unit 140, and a storage unit 150.

The power supply unit 110 functions as a discharger that converts electric power from the storage battery packs 200 electrically connected to the connection units 120 to electric power to be discharged. That is, the power supply unit 110 discharges electric power of the storage battery packs 200 connected to the connection units 120 through the connection units 120. The power supply unit 110 converts electric power to, for example, appropriate direct-current (DC) power or alternating-current (AC) power with an appropriate frequency and an appropriate voltage. The power supply unit 110 includes a discharging circuit that outputs the converted electric power to the power supply unit 110.

The power supply unit 110 functions as a charger that converts electric power received from an external power supply such as a system or a power generator to electric power for charging the storage battery packs 200 connected to the connection units 120. That is, the power supply unit 110 charges the storage battery packs 200 connected to the connection units 120 through the connection units 120. The power supply unit 110 converts, for example, AC power to DC power with a voltage appropriate for charging. The power supply unit 110 includes a charging circuit that outputs the converted electric power to the storage battery packs 200 electrically connected to the connection units 120. In this example, the power supply unit 110 includes the functions of both the discharger and the charger. However, the present disclosure is not limited to this example. The power supply unit 110 only needs to include the function of at least one of the discharger or the charger.

The power supply unit 110 is implemented by, for example, an AC/DC converter and a DC/AC inverter.

Each of the connection units 120 performs transmission and reception of electric power and communication of information between the connection unit 120 and the storage battery pack 200 connected to the connection unit 120. Each of the connection units 120 includes a connector 121, an information holder 122, and a first transmission unit 123. Each of the connection units 120 is configured by integrating the connector 121, the information holder 122, and the first transmission unit 123.

Each connector 121 is electrically connected to a corresponding one of the storage battery packs 200. The connector 121 includes a connection terminal for transmitting and receiving electric power between the power supply unit 110 and the storage battery pack 200 connected to the connector 121. The connector 121 includes a connection terminal for transmitting identification information (hereinafter referred to as a "slot ID") of the connector 121 to a corresponding one of the storage battery packs 200 connected to the connector 121. That is, the connector 121 is implemented by a connector for performing transmission and reception of electric power and communication of information between the connector 121 and a corresponding one of the storage battery packs 200.

The information holder 122 holds a slot ID of the connector 121. The information holder 122 may further hold identification information (hereinafter referred to as a "system ID") of the storage system 100. The information holder 122 is implemented by, for example, a nonvolatile memory.

The first transmission unit 123 is electrically connected to the connector 121 and the information holder 122, and transmits a slot ID of the connector 121 held by the information holder 122 to the storage battery pack 200 connected to the connector 121. The first transmission unit 123 is implemented by, for example, a microprocessor.

The communication unit 130 performs information communication with the storage battery packs 200. The communication unit 130 also performs information communication with the external communication device 300. Specifically, the communication unit 130 includes a reception unit 131 and a second transmission unit 132.

The reception unit 131 receives identification information (hereinafter referred to as "battery IDs") of the storage battery packs 200 connected to the connection units 120 and slot IDs of connectors 121 connected to the storage battery packs 200, from the storage battery packs 200 through wireless communication. The reception unit 131 receives the battery IDs, system IDs of the storage system 100 connected to the storage battery packs 200, and the slot IDs of the connectors 121 connected to the storage battery packs 200, from the storage battery packs 200 through wireless communication. Specifically, the reception unit 131 receives associated information in which the battery IDs, the system IDs, and the slot IDs are associated.

The second transmission unit 132 transmits associated information stored in the storage unit 150 to the server device 400 through the communication device 300.

The communication unit 130 may be implemented by, for example, a communication module that performs wireless communication such as Wi-Fi (registered trademark) or Bluetooth (registered trademark) with the communication device 300 or the storage battery packs 200, or may be implemented by a LAN I/F for wired communication with the communication device 300. That is, the communication unit 130 may be divided between a unit for communication with the communication device 300 and a unit for communication with the storage battery packs 200, or may be an integrated unit.

If a system ID of the storage system 100 received by the reception unit 131 coincides with a system ID of the storage system itself (i.e., the storage system 100 including this control unit 140), the control unit 140 causes the storage unit 150 to store a battery ID of the storage battery pack 200 and a slot ID of the connector 121 to which the storage battery pack 200 is connected. The control unit 140 is implemented by, for example a processor or a memory storing a program.

The storage unit 150 stores the battery ID of the storage battery pack 200 and the slot ID of the connector 121 connected to the storage battery pack 200, received by the reception unit 131. The storage unit 150 may previously store a system ID of the storage system 100. The storage unit 150 is implemented by, for example, a hard disk or a memory device such as a nonvolatile memory. The storage unit 150 may be implemented by a volatile memory such as a random access memory (RAM) or a cash memory included in a processor.

[1-1-2. Storage Battery Pack]

Next, a functional configuration of the storage battery packs 200 will be described.

As illustrated in FIG. 5, each of the storage battery packs 200 functionally includes a storage battery 210, a control unit 220, a wireless communication unit 230, a storage unit 240, and the connector 250.

The storage battery 210 is constituted by a plurality of cells that are connected in parallel or in series. The cells are, for example, lithium ion secondary batteries.

The control unit 220 controls discharging from the storage battery 210 to the storage system 100 connected to the connector 250 through the connector 250 and charging from the storage system 100 to the storage battery 210 through the connector 250. The control unit 220 acquires information concerning the state of the storage battery 210 (hereinafter referred to as "state information"). Specifically, as the state information of the storage battery 210, the control unit 220 acquires a voltage value, a current value, an SOC, the number of charging/discharging cycles, an internal resistance value, a battery voltage difference, and an malfunction state, for example, of the storage battery 210.

The control unit 220 generates associated information obtained by associating the battery ID of the corresponding storage battery pack 200 stored in the storage unit 240, the slot ID of the connector 121 electrically connected to the corresponding connector 250, and the system ID of the storage system 100 acquired through the connector 250. The control unit 220 may further associate the associated information with state information of the storage battery 210. The control unit 220 causes the wireless communication unit 230 to transmit the generated associated information and the state information of the storage battery 210.

The wireless communication unit 230 performs wireless communication with the communication unit 130 of the storage system 100. Specifically, the wireless communication unit 230 transmits associated information including the slot ID and the system ID of the connection unit 120 acquired through the connector 250 and the battery ID of the storage battery pack 200 stored in the storage unit 240 that are associated together, to the server device 400 through the communication device 300. The wireless communication unit 230 may transmit state information of the storage battery 210 associated with the associated information to the server device 400 through the communication device 300. The wireless communication unit 230 is implemented by, for example, a communication module that performs wireless communication such as Wi-Fi (registered trademark) or Bluetooth (registered trademark).

The storage unit 240 stores a battery ID of the corresponding storage battery pack 200. The storage unit 240 also stores state information of the storage battery 210 acquired by the control unit 220. The storage unit 240 is implemented by, for example, a hard disk drive or a nonvolatile memory.

The connector 250 corresponds to the connector 121 of the storage system 100, and is electrically connected to each connection terminal of the connector 121. The connectors 250 includes a connection terminal for transmitting and receiving electric power to/from the storage system 100 and a connection terminal for receiving a slot ID of the connector 121 of the storage system 100 from the connector 121. That is, the connector 250 is implemented by a connector for performing transmission and reception of electric power and information communication between the connector 250 and the storage battery pack 100.

[2. Operation]

Operations of the storage systems 100 and the storage battery pack 200 having the configurations described above will be described with reference to FIG. 6.

Figure 6:
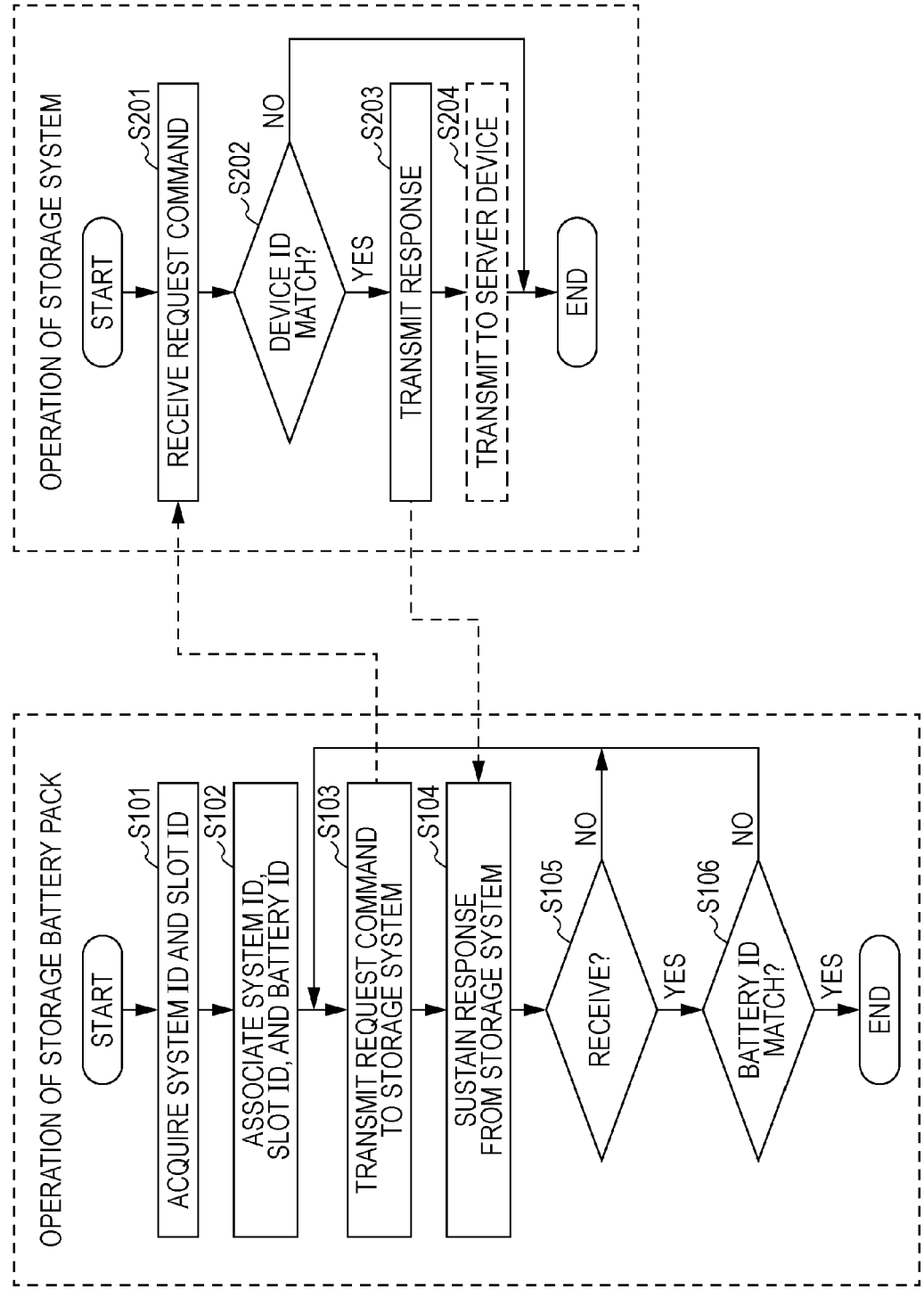
FIG. 6 is a flow chart for describing processes of the storage system and the storage battery pack according to the embodiment.

FIG. 6 is a flow chart for describing operations of the storage system and the storage battery pack according to the embodiment.

An operation of the storage battery pack 200 will now be described. The operation of the storage battery pack 200 starts when the storage battery pack 200 is connected to the connection unit 120 of the storage system 100.

First, the control unit 220 of the storage battery pack 200 acquires a system ID of the storage system 100 connected to the storage battery pack 200 and a slot ID of the connector 121 of the connection unit 120 through the connector 250 (S101).

Next, the control unit 220 associates the acquired system ID, slot ID, and battery ID together, thereby generating associated information (S102).

Then, the control unit 220 transmits a request command to the storage system 100 using the wireless communication unit 230 (S103). The request command includes associated information.

Thereafter, the control unit 220 waits for reception of a response from the storage system 100 to the request command (S104).

The control unit 220 determines whether a response has been received from the storage system 100 or not (S105).

If the control unit 220 determines that the response has been received from the storage system 100 (Yes in S105), the control unit 220 determines whether a battery ID included in the received response coincides with a battery ID stored in the storage unit 240 (S106). If the battery IDs coincide with each other (Yes in S106), the operation of the storage battery pack 200 is finished.

On the other hand, if the control unit 220 determines that no response has been received (No in S105) or that a battery ID included in the response does not coincide with a battery ID stored in the storage unit 240 (No in S106), the process returns to step S103, and the process is repeated.

Subsequently, an operation of the storage systems 100 will be described. An operation of the storage system 100 starts when a request command is received from the storage battery pack 200.

First, the reception unit 131 of the storage system 100 receives a request command from the storage battery pack 200 (S201).

Next, the control unit 140 of the storage system 100 determines whether a system ID associated in the associated information included in the received request command coincides with a system ID stored in the storage unit 150 or not (S202).

If the system ID associated in the associated information included in the request command is determined to coincide with the system ID stored in the storage unit 150 (Yes in S202), the control unit 140 transmits a response to the request command to the storage battery pack 200 (S203). The response includes at least a battery ID associated in the associated information included in the received request command.

The control unit 140 transmits the received associated information to the server device 400 using the communication unit 130 (S204).

On the other hand, if the system ID associated in the received associated information is determined not to coincide with the system ID stored in the storage unit 150 (No in S202), the control unit 140 finishes the operation of the storage system 100.

In the case where association among the storage battery packs 200, the connector 121, and the storage system 100 is completed as described above, state information acquired by the control unit 220 of the storage battery pack 200 after the completion is managed while being associated with a slot ID of the connector 121 and a system ID of the storage system 100 associated with the battery ID of the storage battery pack 200. Specifically, the state information may be managed in the storage unit 150 of the storage system 100, or may be transmitted to the server device 400 and managed in the server device 400.

This point will be specifically described with reference to FIG. 7.

Figure 7:
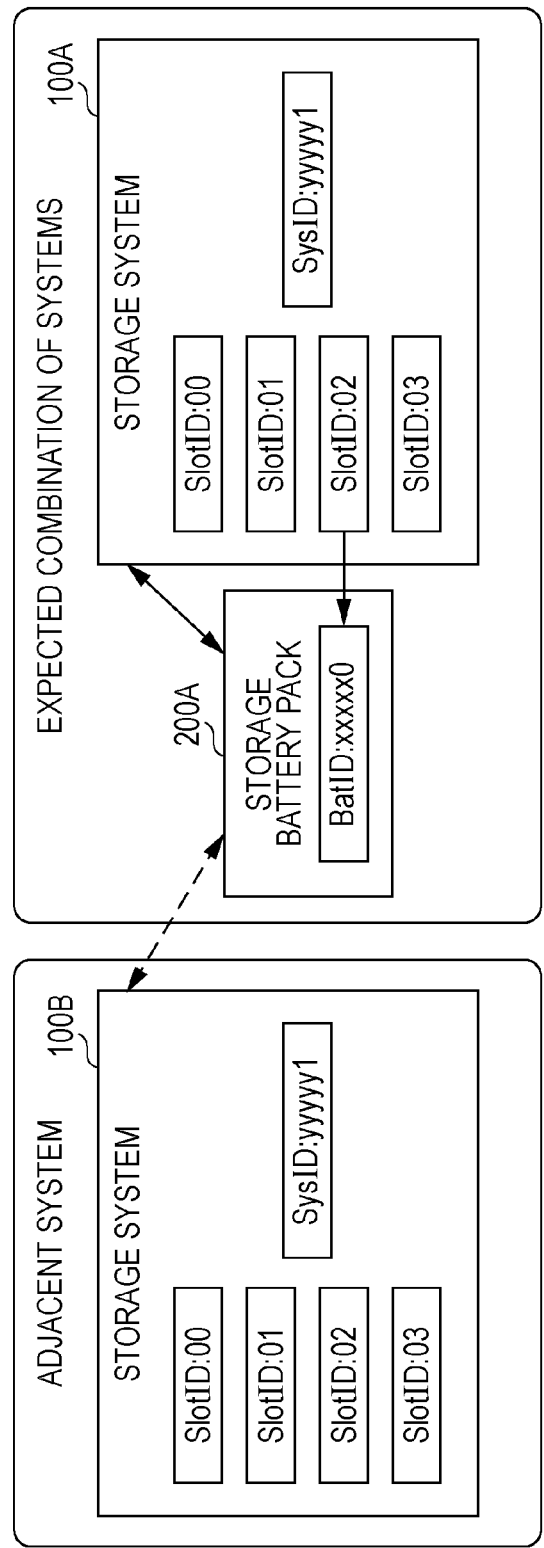
FIG. 7 is a view for describing an example of transmission and reception of information between the storage system and the storage battery pack according to the embodiment.

FIG. 7 is a view for describing an example of transmission and reception of information between the storage system and the storage battery pack according to the embodiment.

As illustrated in FIG. 7, a storage battery pack 200A can wirelessly communicate with both storage systems of an assumed combination of a storage system 100A and a storage system 100B adjacent to the storage system 100A. It is assumed that the storage battery pack 200A is connected to a connector having a slot ID of "SlotID: 02" among the connectors of the storage system 100A. The storage battery pack 200A acquires the slot ID "SlotID: 02" and a system ID "SysID: yyyyy1" of the storage system 100A, and transmits, to the storage system 100A and the storage system 100B, the slot ID and the battery ID, together with a battery ID "BatID: xxxxx0" of the storage battery pack 200A.

Each of the storage system 100A and the storage system 100B acquires the slot ID "SlotID: 02", the system ID "SysID: yyyyy1", and the battery ID "BatID: xxxxx0", and determines whether the system ID coincides with the system ID of the system 100A or 100B itself. At this time, in the storage system 100A, since the system ID coincides with the acquired system ID "SysID: yyyyy1", it is determined that the storage battery pack 200A that transmitted these IDs is a storage battery pack connected to the storage system itself. Since the storage system 100A also acquired the slot ID "SlotID: 02" at the same time, the storage system 100A can determine to which connector the storage battery pack 200A is connected.

On the other hand, in the storage system 1006, since the system ID does not coincide with the acquired system ID "SysID: yyyyy1", it is determined that the storage battery pack 200A that has transmitted these IDs is a storage battery pack not connected to the storage system itself.

[3. Advantages and Other Characteristics]

As described above, in the storage systems 100 according to the present embodiment, the information holder 122 for holding identification information of the connector 121 is provided in each of the connectors 121, and identification information of the connectors 121 connected to the storage battery pack 200 can be acquired. That is, the reception unit 131 receives, from the storage battery pack 200, identification information of the storage battery packs 200 and identification information of the connectors 121 connected to the storage battery pack 200 through wireless communication. The storage unit 150 stores the identification information of the storage battery pack 200 and the identification information of the connector 121 connected to the storage battery pack 200 in association with each other.

In this manner, it is possible to specify the connector 121 to which the storage battery pack 200 that has transmitted the information is connected, among the connectors 121 of the storage system itself. Thus, in a case where the storage system 100 has acquired state information concerning the state of the storage batteries 210 of the storage battery pack 200 from the storage battery pack 200 as battery information, for example, it is possible to specify a connector connected to the storage battery pack 200 from which the state information has been acquired. Consequently, appropriate measures can be taken for the storage battery pack 200 connected to the storage system 100 based on the state information.

The control unit 140 determines whether the storage battery pack 200 that has transmitted the identification information of the storage battery pack 200 and the identification information of the connector 121 is a storage battery pack 200 connected to the storage system itself or not, using the received identification information of the storage battery pack 200 and the identification information of the connector 121 connected to the storage battery pack 200. If the identification information of the storage system 100 received by the reception unit 131 coincide with identification information of the storage system itself, the control unit 140 causes the storage unit 150 to store the identification information of the storage battery pack 200 and the identification information of the connector 121 connected to the storage battery pack 200. In this manner, storage of information from the storage battery packs 200 not connected to the storage system itself can be reduced.

The storage system 100 further includes a transmission unit for transmitting identification information of the connector 121 to the storage battery pack 200, and thus, can transmit identification information of the connector 121 to the storage battery pack 200.

The connector 121, the information holder 122, and the first transmission unit 123 are integrated as the connection unit 120 of the storage battery pack 200. Thus, the connector 121 and the information holder 122 can be previously associated with each other so that identification information held in the information holder 122 can be transmitted to the storage battery pack 200 connected to the connector 121. In this manner, since the connector 121 and the information holder 122 are previously associated with each other, when the storage system 100 is assembled, erroneous wiring between the connector 121 and the information holder 122 can be suppressed. Consequently, transmission of wrong identification information to the storage battery pack 200 can be reduced.

(Other Embodiments)

The embodiment has been described as an example of a technique of the present disclosure. The technique of the present disclosure, however, is not limited to this example, and is applicable to other embodiments subjected to change, replacement, addition, and/or omission, for example, as necessary. The components described in the above embodiment may be combined to obtain other embodiments.

Specifically, other embodiments will be described below.

For example, in the above embodiment, the connector 121, the information holder 122, and the first transmission unit 123 are integrated as the connection unit 120. However, the present disclosure is not limited to this example, and the connector 121, the information holder 122, and the first transmission unit 123 may be individually provided. The first transmission unit 123 is not necessarily provided, and it is sufficient that the storage battery pack 200 connected to the connector 121 can acquire identification information held in the information holder 122.

In the above embodiment, the control unit 140 of the storage system 100 determines whether identification information of the storage system 100 received by the reception unit 131 coincides with identification information of the storage system itself. Alternatively, this determination may not be performed by the control unit 140. For example, identification information of the storage system 100 received by the reception unit 131 and identification information of the storage system itself may be transmitted to an external device such as the server device 400 so that the external device performs the determination. If the two pieces of identification information coincide with each other, identification information of the storage unit of the external device or the storage unit 150 of the storage system 100 may store identification information of the storage battery pack and identification information of the connector.

In the above embodiment, the control unit 220 of the storage battery pack 200 associates a system ID, a slot ID, and a battery ID, but may transmit the system ID, the slot ID, and the battery ID to the storage system 100 without association. When receiving the unassociated system ID, slot ID, and battery ID, the control unit 140 of the storage system 100 may associate these system IDs, slot ID, and battery ID. For example, when the control unit 140 receives the system ID, the slot ID, and the battery ID at the same timing (within a predetermined period), the control unit 140 associates the system ID, the slot ID, and the battery ID with each other. Furthermore, the storage system 100 may transmit the system ID, the slot ID, and the battery ID to the server device 400 so that the server device 400 associates the received system ID, slot ID, and battery ID.

In the above embodiment, the storage system 100 acquires associated information in which the system ID, the slot ID, and the battery ID are associated. Alternatively, the storage system 100 may acquire associated information in which state information of the storage battery pack 200 is associated instead of battery ID. Even in this case, since the storage system 100 can acquire state information associated with the slot ID, appropriate measures depending on the state information can be performed on the storage battery packs 200.

In the above embodiment, the information holder 122 may include a resistance element having a predetermined resistance value. In this case, the information holder 122 holds the resistance value of the resistance element as identification information. The resistance value of the resistance element is measured by a voltage value or a partial pressure value obtained when a constant current or a constant voltage is applied to the resistance element. Specifically, the multiple connectors 121 have resistance elements having different resistance values. The storage battery pack 200 applies a constant current or a constant voltage to the resistance elements when connected to the connectors 121 so that the obtained voltage value or partial pressure value or a resistance value calculated based on the obtained voltage value or partial pressure value and a constant current and a constant voltage can be acquired as identification information. At this time, the storage system 100 may not include the first transmission unit 123 illustrated in FIG. 1. Each resistance element may be configured to have its resistance value changed by switching, for example, a DIP switch to switch a connection state of a plurality of resistance element.

Although not specifically described in the above embodiment, each of the storage system and the storage battery pack may further include a display unit. For example, in the storage system, when information is transmitted to the server device 400 at step S204 or a response is transmitted to the storage battery pack 200, the display unit provides a display indicating completion of an operation concerning the transmission. For example, in the storage battery pack, the display unit may provide a display indicating coincidence of battery IDs when it is determined that the battery IDs coincide with each other at step S106. Specifically, the display unit is implemented by a light-emitting device such as an LED, and provides a display indicating the completion and a display indicating the coincidence by lighting.

In the above embodiment, the identification information held in the information holder 122 is transmitted to the storage battery pack 200 through wired communication. The present disclosure, however, is not limited to this example, and the identification information may be transmitted through wireless communication using near field communication (NFC), for example. In this case, the wireless communication is preferably performed between closely disposed packs in such a manner that identification information is transmitted from the information holder 122 only to the storage battery pack 200 connected to the connector 121 without fail.

In the above embodiment, each component may be implemented by a dedicated hardware or by executing a software program suitable for the component. Each component may be implemented by reading and executing a software program stored in a hard disk or a recording medium such as a semiconductor memory with a program execution unit such as a CPU or a processor. Software for implementing, for example, the storage system and the storage method according to the embodiment are programs as follows.

Specifically, the program is a program executable in a storage system including connectors electrically connected to a plurality of storage battery packs respectively, and causes a computer to execute a process of receiving identification information of the storage battery packs and identification information of the connectors connected to the storage battery packs from the storage battery packs through wireless communication and a process of storing the identification information of the storage battery packs and the identification information of the connectors connected to the storage battery packs received by the reception process.

The storage system and the storage method according to one or more aspects of the present disclosure have been described based on the embodiments. The present disclosure, however, is not limited to these embodiments. Various modifications conceivable to those skilled in the art applied to the embodiments are also included in one or more aspects of the present disclosure, unless such modifications deviate from the spirit of the present disclosure.

The present disclosure is useful as, for example, a storage system that can specify a correlation between a storage battery pack and a connector connected to the storage battery pack.

What is claimed is:

1. A system comprising:
   connectors electrically connected to storage battery packs respectively;
   at least one of a discharger that discharges electric power of the storage battery packs through the connectors and a charger that charges the storage battery packs through the connectors;
   an information holder that holds identification information of the connectors;
   a receiver, wirelessly communicating with the storage battery packs, that receives information of the storage battery packs and the identification information of the connectors connected to the storage battery packs from the storage battery packs, the storage battery packs receiving the identification information of the connectors from the information holder through the connectors; and
   a first memory that stores the received information of the storage battery packs and the received identification information of the connectors connected to the storage battery packs.

2. The system according to claim 1, further comprising a plurality of information holders, each corresponding to one of the connectors, wherein each of the connectors and its corresponding information holder are integrated as a connection device of a corresponding one of the storage battery packs.

3. The system according to claim 1, further comprising first transmitters that each transmits the identification information of a corresponding one of the connectors to a corresponding one of the storage battery packs.

4. The system according to claim 3, further comprising a plurality of information holders, each corresponding to one of the connectors, wherein each of the connectors, a corresponding one of the information holders, and a corresponding one of the first transmitters are integrated as a connection device of a corresponding one of the storage battery packs.

5. The system according to claim 1, wherein
   the information holder also holds identification information of the system,
   the receiver receives identification information of the storage battery packs, identification information of the system, and the identification information of the connectors connected to the storage battery packs from the storage battery packs through wireless communication, and
   the system further comprises a controller, and wherein if the identification information of the system received by the receiver coincides with identification information of the system itself, the controller causes the first memory to store the identification information of the storage battery packs and the identification information of the connectors connected to the storage battery packs.

6. The system according to claim 5, further comprising a transmitter that transmits the identification information of the storage battery packs, the identification information of the system, and the identification information of the connectors connected to the storage battery packs stored in the first memory to a server device.

7. The system according to claim 1, wherein the information holder stores a slot ID of each connector and a system ID of the system itself, wherein the receiver receives the slot ID of each connector as the identification information of the connectors, and the first memory stores the received slot ID.

8. The system according to claim 7, wherein the receiver also receives battery IDs transmitted from the storage battery packs.

9. The system according to claim 8, wherein the system further comprises a controller that determines whether a storage battery pack that has transmitted its battery ID to the receiver is the storage battery pack that is connected to the system using the transmitted battery ID and received identification information of the connector connected to the storage battery pack.

10. The system according to claim 8, wherein the system further comprises a controller that associates the system ID, the battery ID, and the slot ID transmitted from the storage battery pack when the controller receives the system ID, the battery ID, and the slot ID transmitted from the storage battery pack within a predetermined period of each other.

11. A method performed by a system having connectors electrically connected to storage battery packs respectively, at least one of a discharger that discharges electric power of the storage battery packs through the connectors and a charger that charges the storage battery packs through the connectors, and an information holder that holds identification information of the connectors, the method comprising:
    transmitting identification information of the connectors connected to the storage battery packs to the storage battery packs from the information holder through the connectors;
    wirelessly receiving, with a receiver, from the storage battery packs identification information of the storage battery packs and the identification information of connectors connected to the storage battery packs; and storing in a first memory the received identification information of the storage battery packs and the received identification information of the connectors connected to the storage battery packs.

12. The method according to claim 11, wherein the system further includes a controller and the information holder also holds identification information of the system, the method further comprising:

wirelessly receiving, with the receiver, identification information of the storage battery packs, identification information of the system, and the identification information of the connectors connected to the storage battery packs from the storage battery packs; and wherein if the received identification information of the system received by the receiver coincides with identification information of the system itself, the controller causes the first memory to store the identification information of the storage battery packs and the identification information of the connectors connected to the storage battery packs.

13. The method according to claim 12, further comprising:

transmitting, with a transmitter, the identification information of the storage battery packs, the identification information of the system, and the identification information of the connectors connected to the storage battery packs stored in the first memory to a server device.

14. The method according to claim 11, wherein the information holder also stores a slot ID of each connector and a system ID of the system itself, the method further comprising:

receiving, with the receiver, the slot ID of each connector as the identification information of the connectors; and storing, with the first memory, the received slot ID.

15. The method according to claim 14, further comprising:

receiving, with the receiver, battery IDs transmitted from the storage battery packs.

16. The method according to claim 15, wherein the system further comprises a controller, the method further comprising determining, with the controller, whether a storage battery pack that has transmitted a battery ID to the receiver is the storage battery pack that is connected to the system using the transmitted battery ID and the slot ID of the connector connected to the storage battery pack.

17. The method according to claim 15, wherein the system further comprises a controller, the method further comprising:

associating, with the controller, the system ID, the battery ID, and the slot ID transmitted from the storage battery pack when the controller receives the system ID, the battery ID, and the slot ID transmitted from the storage battery pack within a predetermined period of each other.

18. A storage system comprising:

a package housing therein a plurality of connection devices, each having:

a connector electrically connected to a corresponding storage battery pack;

an information holder that holds identification information of the connector; and a first transmitter that transmits the identification information of the connector to the corresponding storage battery pack;

at least one of a discharger that discharges electric power of the storage battery packs through the connectors and a charger that charges the storage battery packs through the connectors; and a communicator having a receiver, wirelessly communicating with the storage battery packs, that receives information of the storage battery packs and the identification information of the connectors connected to the storage battery packs from the storage battery packs; and a memory that stores the received information of the storage battery packs and the received identification information of the connectors connected to the storage battery packs.

* * * * *